US006967596B2

(12) United States Patent
Nguyen (10) Patent No.: US 6,967,596 B2
(45) Date of Patent: Nov. 22, 2005

(54) WEARABLE DATA INPUT DEVICE EMPLOYING WRIST AND FINGER MOVEMENTS

(76) Inventor: Quang Q. Nguyen, 12629-70th Ave. S., Seattle, WA (US) 98178-4311

( * ) Notice: Subject to any disclaimer, the term of this patent is extended or adjusted under 35 U.S.C. 154(b) by 474 days.

(21) Appl. No.: 10/373,123

(22) Filed: Feb. 24, 2003

(65) Prior Publication Data

US 2004/0164880 A1  Aug. 26, 2004

(51) Int. Cl.[7] ............................................ H03K 17/94
(52) U.S. Cl. ........................ 341/20; 345/157; 345/168; 463/37
(58) Field of Search ........................ 341/20; 345/157, 345/168; 463/37

(56) References Cited

U.S. PATENT DOCUMENTS

| 4,414,537 A | * | 11/1983 | Grimes .......................... 341/20 |
| 4,722,625 A | * | 2/1988 | O'Brien .......................... 401/6 |
| 4,905,001 A | | 2/1990 | Penner |
| 5,212,372 A | | 5/1993 | Quick et al. |
| 5,488,362 A | * | 1/1996 | Ullman et al. ................. 341/20 |
| 5,571,020 A | * | 11/1996 | Troudet ....................... 434/233 |
| 5,583,478 A | * | 12/1996 | Renzi ....................... 340/407.1 |
| 5,612,689 A | | 3/1997 | Lee, Jr. |
| 6,333,734 B1 | | 12/2001 | Rein |
| 6,707,447 B1 | * | 3/2004 | Goranowski ................. 345/167 |

* cited by examiner

Primary Examiner—Albert K. Wong
(74) Attorney, Agent, or Firm—David L Tingey (57) ABSTRACT

A data input device that substitutes for a traditional keyboard employs the same finger and wrist movements that a user employs on a keyboard but without a keyboard enabling a user's hands to rest comfortably in the user's lap or otherwise as the user may choose. Finger positions are identified for symbols and commands by tracking a user's wrist movement in pitch and yaw, which when combined with traditional finger movements multiplies the number of positions representative of symbols and commands. The data input device thus identifies and communicates a full set of symbols and commands of a traditional keyboard to a computer processor. The device typically employs a glove adapted to fit snugly on a user's hand outfitted with necessary switches to track the user's finger and wrist movement. With the finger and wrist moved to identify a selected symbol or command, a dichotomous finger switch connected between the metacarpus and each finger is actuated by downward movement of a finger similar to that employed in operation of a traditional keyboard. Finger and thumb movement is tracked between at least three pitch positions. Wrist movement is likewise tracked between at least three yaw positions and three pitch positions.

21 Claims, 8 Drawing Sheets

WEARABLE DATA INPUT DEVICE EMPLOYING WRIST AND FINGER MOVEMENTS

BACKGROUND

1. Field of the Invention

This invention pertains to devices for data entry, and more particularly, to devices in lieu of keyboards that input data to a computer equivalent to keystroke data.

2. Prior Art

Keyboard entry is commonly used for input of data to a computer. Typically, the keyboard is used on a desktop to support the keyboard. Both user hands placed on the keyboard keys enter data with repeated strokes of fingers (or thumb) on a selective key.

It is known to have data entry devices other than keyboards, which devices might not require both hands or a desktop. Some of the devices attach paraphernalia to the user's fingers to monitor finger movement. However, finger movement alone does not replicate traditional hand and finger movement familiar in keyboard use and does not provide sufficient discrete finger positions to identify with a single keystroke, or a keystroke in combination with a another key, in the manner of well-known keyboard entry a full set of symbols and commands typically found on a keyboard.

It is the object of the present invention to present a data input device that substitutes for a traditional keyboard, employing the same finger and wrist movements that a user employs on a keyboard, but is usable without a keyboard with the user's hands resting comfortably in the user's lap or otherwise as the user may choose. It is a further object to provide additional finger positions for identifying additional symbols and commands by tracking a user's wrist movement in pitch and yaw, which when combined with traditional finger movements multiplies the number of positions representative of symbols and commands. It is a further object to provide a data input device that can identify and communicate a full set of symbols and commands of a traditional keyboard using only a single hand.

SUMMARY

These objects are achieved in a glove adapted to fit snugly on a user's hand, the glove outfitted with necessary structure to track the user's finger and wrist movement. With the finger and wrist moved to identify a selected symbol or command, a finger switch on the hand or forearm and connected to each finger is actuated by downward movement similar to that employed in operation of a traditional keyboard. The switch, like a key on a keyboard, is dichotomous between active and inactive, or on and off, states. When the finger is down, the switch is on, or active; when the finger is up, the switch is off, or inactive.

Finger movement is tracked between at least three pitch positions; thumb movement is typically tracked between two pitch positions as in a traditional keyboard, though the thumb could also include one or more discrete yaw positions. Wrist movement is likewise tracked between at least three yaw positions and three pitch positions. Thus, for each hand, if four fingers and the thumb each have three discrete positions in addition, or independent of downward motion to activate the finger switch, and each of the nine wrist positions represent additional discrete positions usable in combination with the 15 positions of the fingers and thumb, there obtains a total of 135 available single stroke positions, which is adequate to represent all standard symbols and commands of a traditional keyboard with one hand, including symbols reached by use of a "shift" key and still have many commands available by use of an "alt" key and a "ctrl" key. In use, a wrist position may be reserved as indicating the traditional "shift" key and another wrist position may be reserved as indicating the "alt" and "ctrl" keys, for example.

It is intended that the device be used with both left and right hands, in which case, the wrist and finger pitch positions can be combined into a single set of three pitch positions for each finger and thumb.

DETAILED DESCRIPTION OF THE PREFERRED EMBODIMENT

The present invention comprises a glove 10 adapted to fit snugly on a user's hand 100, or two gloves on the user's two hands. The gloves are mirror images of each other. Therefore, in interest of ease of description and to minimize duplication of description, only a single glove is described. It is understood, however, that a like description could be given for another mirror glove for a user's other hand and the invention is deemed to include a glove for each of the user's hands. It is further to be understood that the term glove is meant generally as any structure or mechanism that connects the described components to the user's hands in any manner that tracks and conveys movement of the user's wrist and fingers and thumb to the described components. For example, the described components may be secured directly to a user, bypassing a glove. Though conceivable, it is anticipated that a user would find that to be inconvenient, preferring a glove with the components already installed and interconnected in their required positions relative to the hand.

Also for ease of description, the user's arm is described as having a forearm 102 followed by a hand 100 at a wrist 104. The hand 100 is described as having a metacarpus 106, generally meant to indicate the body of the hand less fingers and thumb. Fingers 108 and thumb 110 then extend from the metacarpus 106 through finger and thumb metacarpal joints 112, 114, or knuckle. After the metacarpal joint, the fingers 108 and thumb 110 are described as having finger and thumb proximal segments 116, 118, respectively. Next, or proximal joints 120, are followed by intermediate segments 122, between the proximal joint 120 and distal joint 124, and then distal segments 126 following the, distal joints 124, again, for each respective finger and thumb. Also for purposes herein, use of the term "proximal" is meant to be toward the user's forearm as opposed to the term "distal" which is meant to be toward the user's fingertips.

The glove and device components are described in terms representing a relationship with user's arm physiology. That is a glove or device component with a name similar to an element of a person's physiology is similar to, associated with or next to that element of the physiology.

In keeping with that nomenclature guidance, the glove 10 has a forearm section 12 that covers a portion of a user's forearm 102, a metacarpal section 14 that covers the user's metacarpus 106, and finger sections 16 and a thumb section 18, including proximal and intermediate sections 19 and 21, that fit over the user's fingers and thumb 110. The glove 10 is close fitting so movement of the user's hand causes the glove to similarly move.

The glove 10 is further outfitted with members adapted to track movement of the user's hand, fingers and thumb as the glove moves with the user's hand. The members include a forearm member 20, a metacarpal member 22, and a plurality of finger members 24. The forearm member 20 attaches to the glove forearm section 12; the metacarpal member 22 attaches to the glove metacarpal section 14, and the finger members 24 attach to the glove finger and thumb sections 16, 18. For these purposes, the term "attaches" or "attaches to the glove" is meant to include connection with the glove in any way that provides that the respective members move in concert with movement of the user's hand. This includes direct attachment of respective members to the user's hand with or without use of a glove. The glove is for convenience of carrying and mutually associating the members and for ease of installing the members on the user's hand. The members may also be secured directly to the user's hand and by-pass the glove without detracting from the invention.

Movement of the user's hand 100 is continuously tracked by the members. However, position of the user's wrist 104, that is the position of the metacarpus 106 relative to the forearm 102, is communicated only upon signal from the user. As with use of a keyboard, that signal is downward movement of a finger 108 or thumb 110 corresponding to traditional downward movement of a user's finger or thumb on a keyboard key causing the key to make an electrical connection on a circuit board within the keyboard, therein maintaining the motion in this device that is familiar with the user in keyboard use. Instead of finger downward motion activating a key on a keyboard to communicate a symbol or command, a finger switch 30 for each finger 108 is mounted on a proximal side 32 of each of the metacarpal joints 112, 114, typically to the glove in the glove forearm or metacarpal section 12, 14. A tether 34 extends between each of the finger members 23 on the distal side 36 of the respective metacarpal joint 112, 114 and the finger switches 30 on the proximal side 32 such that when the finger 108 is moved downward, the tether 34 pulls on the switch 30 to make electrical connection within the switch 30, which is released when the finger or thumb movement is reversed, or lifted, similar to lifting the finger off a keyboard key. Because normal downward movement of a finger or thumb 108, 110 maintains the finger proximal and distal joints 120, 124 in a given relative position during the movement, the tether 34 may be connected to the finger at any position on the distal side of the metacarpal joint with like effect.

Figure 1:
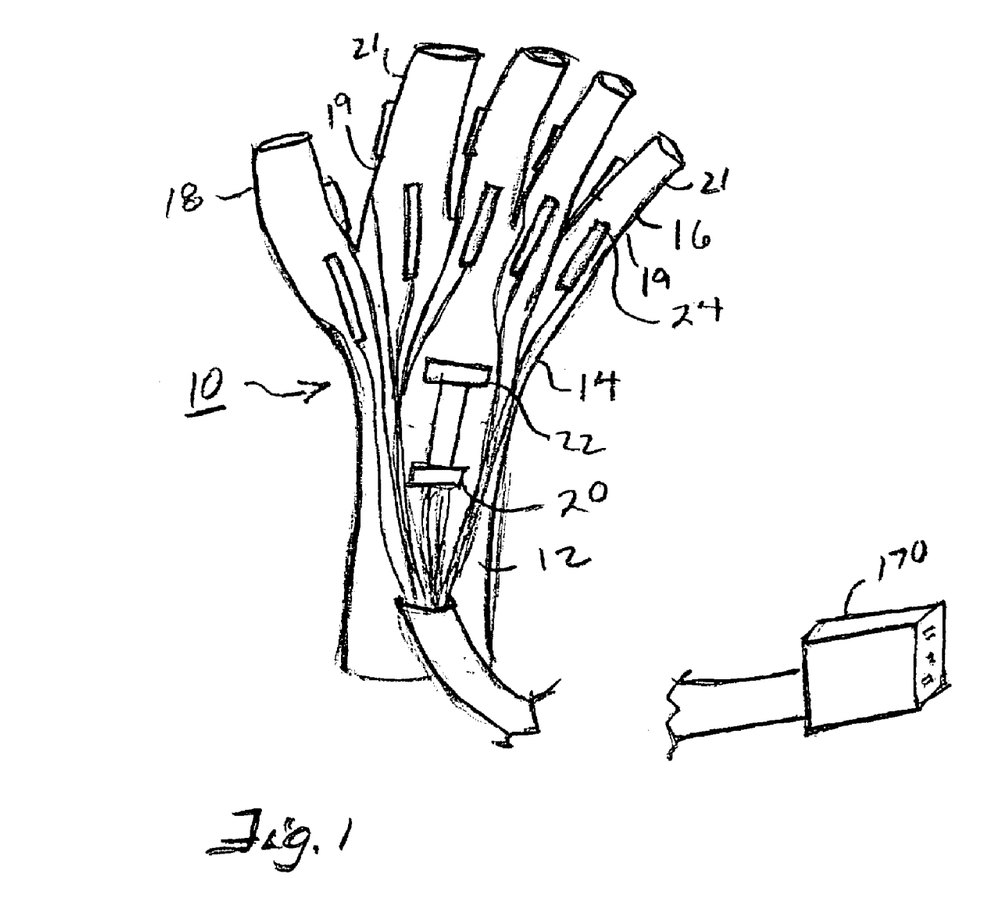
FIG. 1 is a pictorial view of a glove supporting a wrist switch, finger switches and finger pitch switches, shown for a right hand but representative of both hands.
Figure 2:
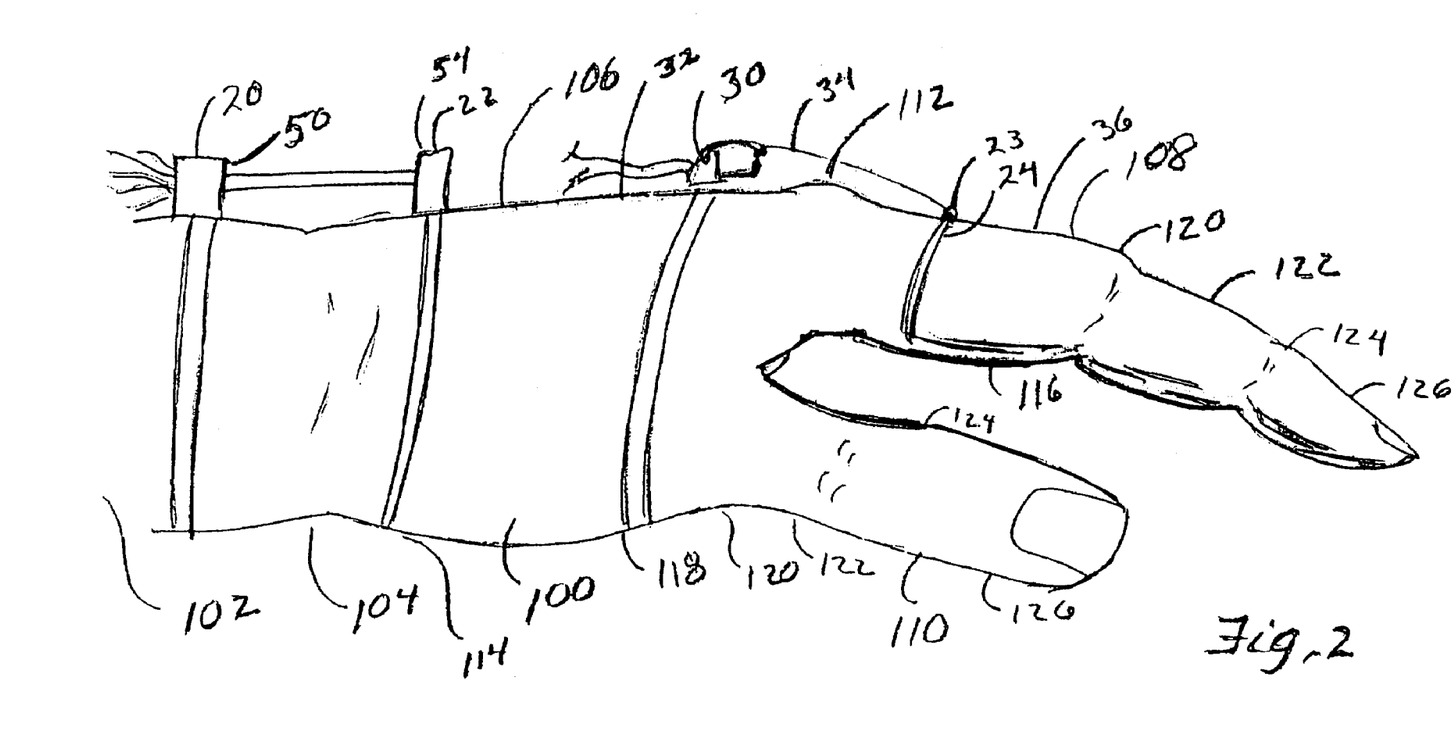
FIG. 2 is a side pictorial view of the wrist switch and finger switches mounted on a hand.
Figure 3A:
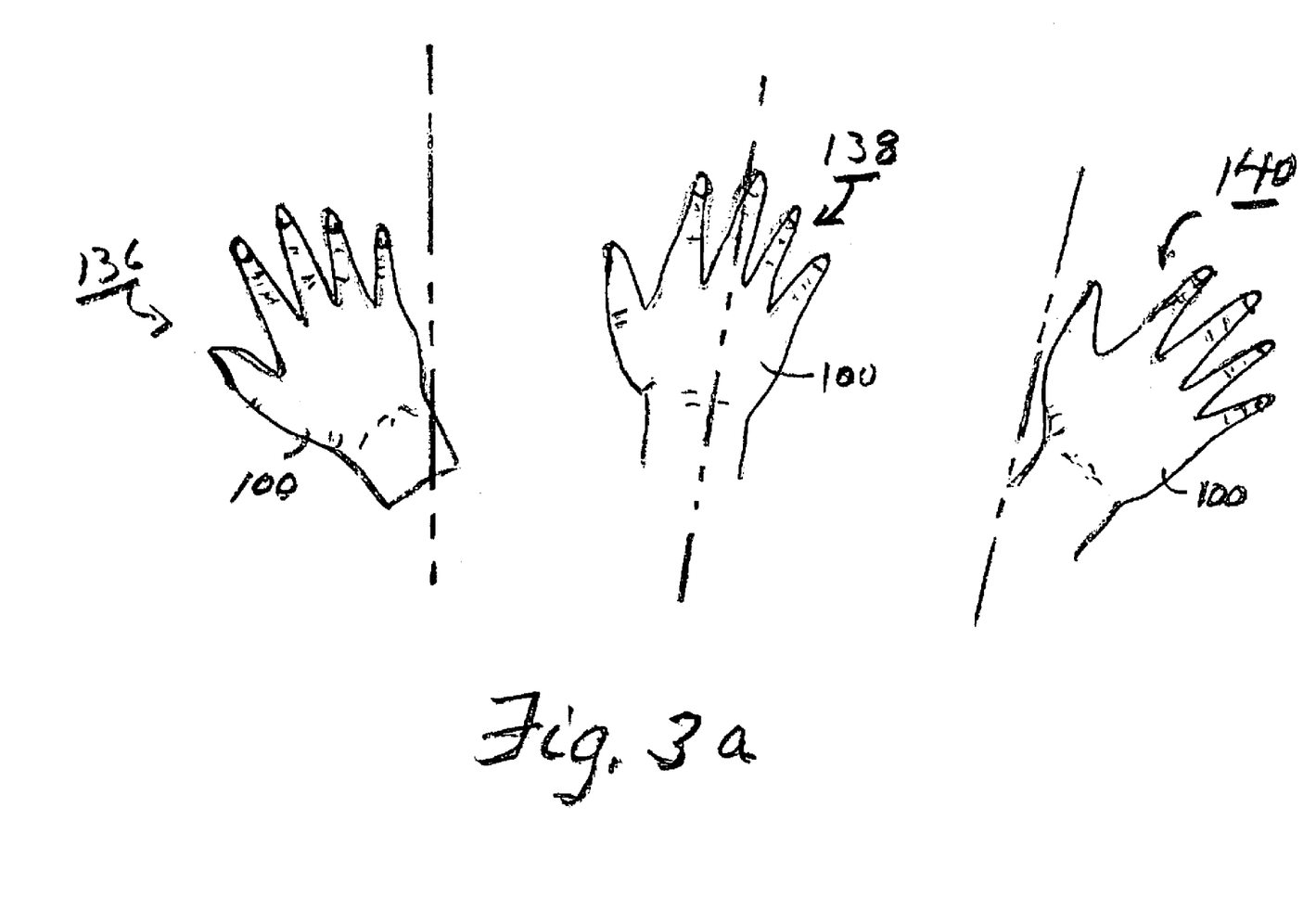
FIG. 3a illustrates several hand positions in yaw.
Figure 3B:
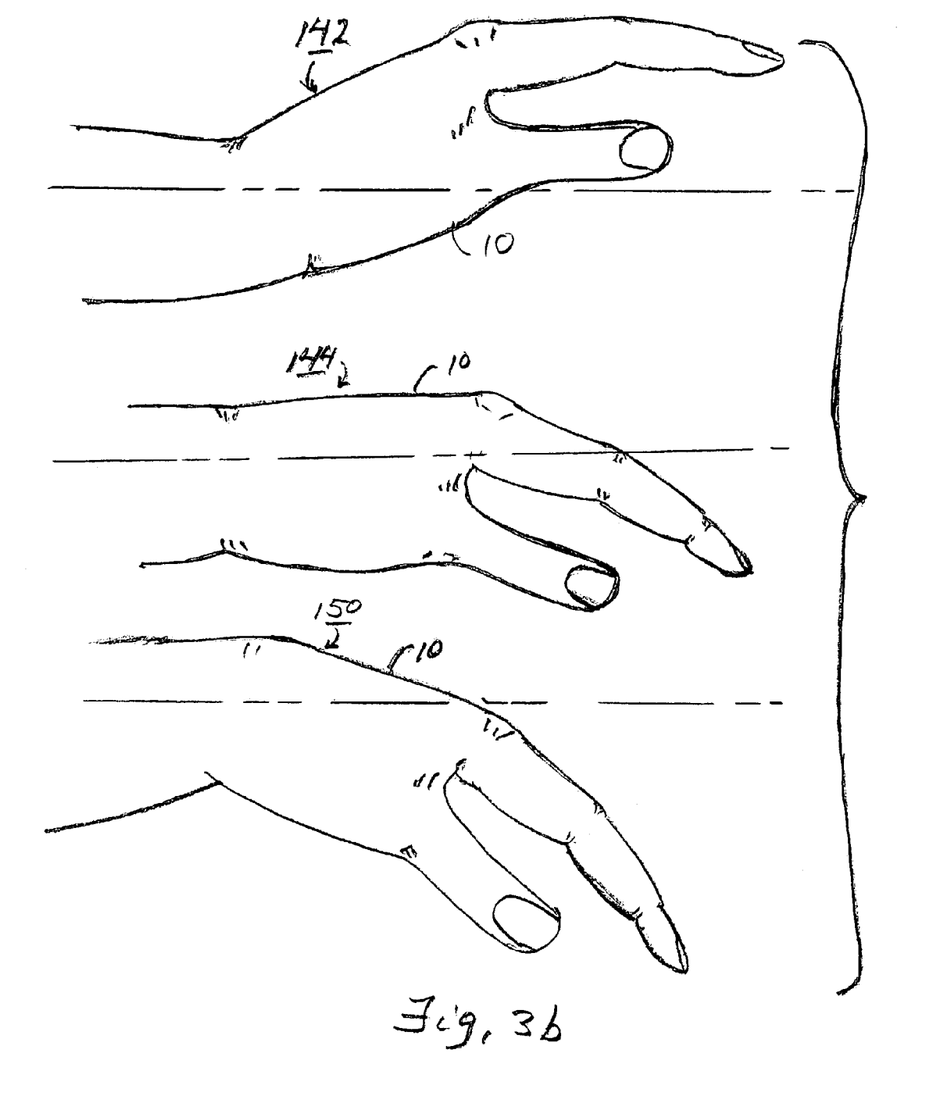
FIG. 3b illustrates several hand positions in pitch.

Identification of an intended symbol or command 130 is achieved by position of a finger or thumb 108, 110 in one of three discrete positions 132, 133, 134 and by position of the user's wrist 104 in one of three positions in yaw 136, 138, 140 and one of three positions in pitch 142, 144, 150. In practice, the three finger positions in pitch and the three wrist positions in pitch may be combined into a total of three positions in pitch. For example, the device may depend entirely on the wrist pitch position without regard to finger pitch position.

Figure 4:
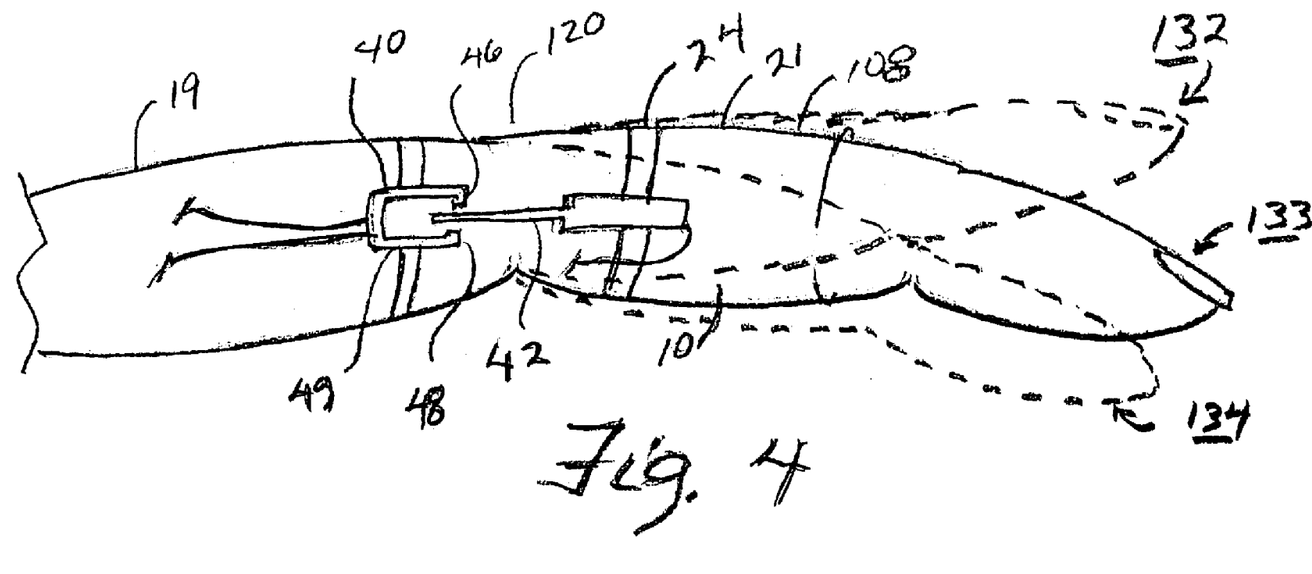
FIG. 4 is a side pictorial view of a finger pitch switch mounted between finger proximal and intermediate segments.

The natural movement of the finger 108 in keyboard use when moving between keyboard rows largely involves rotation within the finger proximal joint 120, although there is also some rotation within the distal joint 124. The thumb 110 is similar though moving in grasp rather than in pitch. It is therefore sufficient to track the position of the finger intermediate segment 122 relative to the finger proximal segment 120. Thus, a finger-thumb pitch switch 40 is provided at the proximal joint 120 of each finger 108 and thumb 110 between the proximal section 19 and the intermediate section 21. It further comprises a finger-thumb pitch actuator 42 extending from the intermediate section 21 between up and down contacts 46 and 48 in a switch housing 49 in the proximal section 19. In the relaxed, or central, finger position no contact is made between the contacts and the actuator. The actuator 42 connects with the up contact 46 and a down contact 48 when the finger 108 or thumb 110, and hence the glove intermediate section 21 is in extension and flexion, respectively, which connection is communicated to a computer processor 170 for interpretation. Clearly, additional positions in finger pitch, representing additional rows of a keyboard, can be added by providing additional contacts on the finger-thumb pitch switch, such as an auxiliary switch above the up switch that makes contact with the up contact when the up contact is urged further upward during further extension of the finger.

Figure 5:
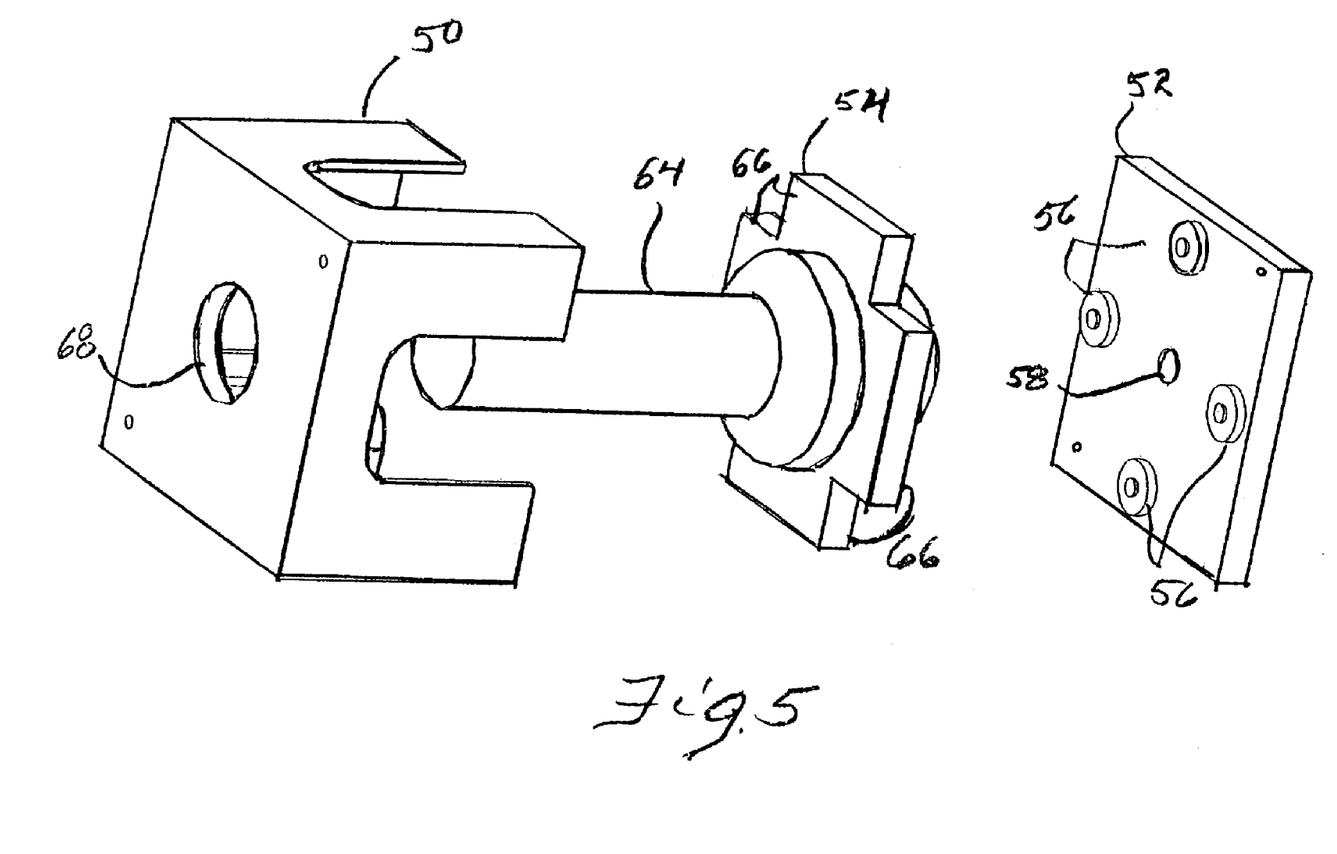
FIG. 5 is a perspective view of a wrist switch.
Figure 6:
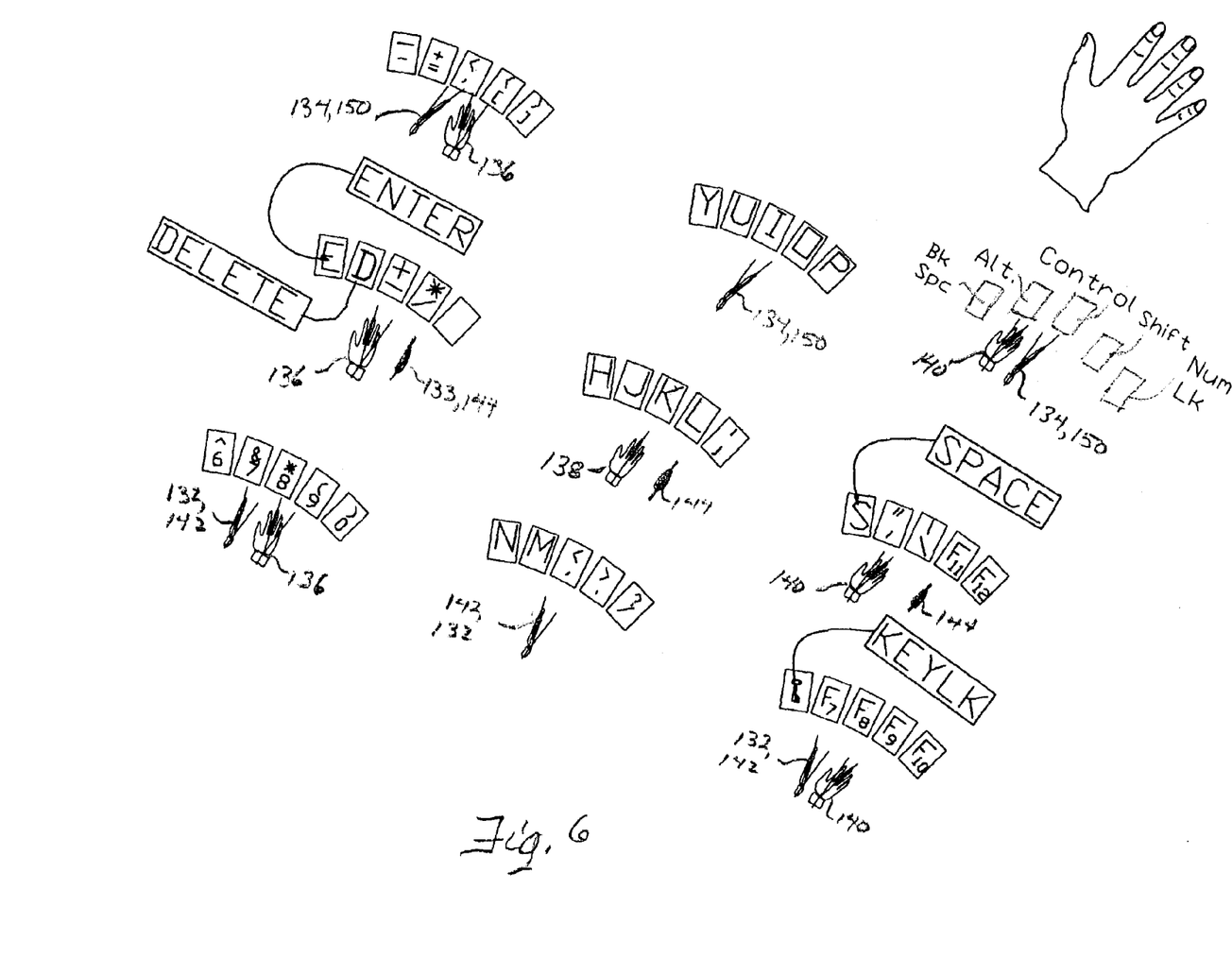
FIG. 6 is a candidate assignment of symbols and commands associated with positions of discrete wrist and finger combinations for a user's right hand.
Figure 7:
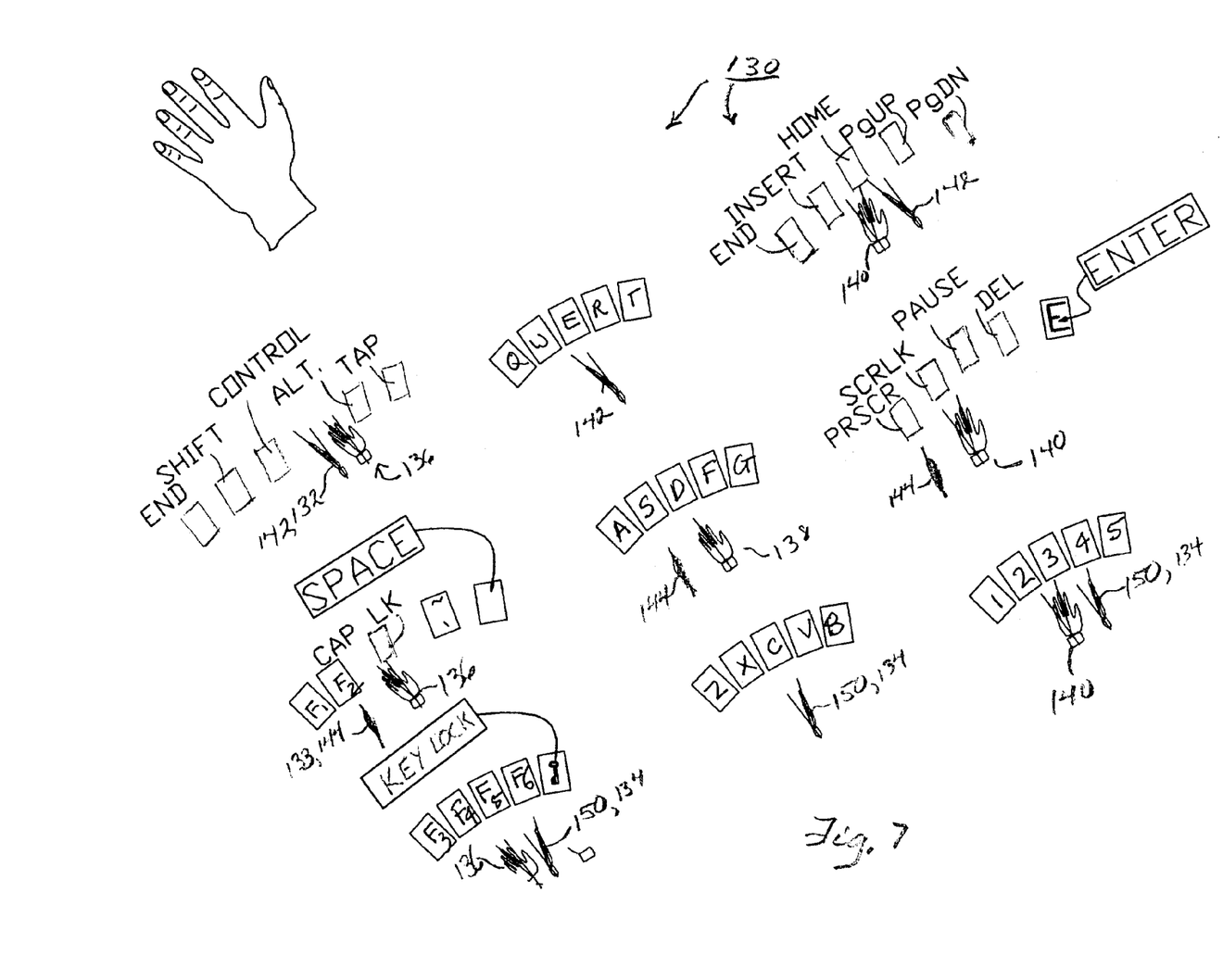
FIG. 7 is a candidate assignment of symbols and commands associated with positions of discrete wrist and finger combinations for a user's left hand.

A wrist movement switch 50 is provided between the forearm member 20 in the glove forearm section 12 and the metacarpal member 22 in the glove metacarpal section 14 to sense movement of the wrist 104 between discrete positions in yaw and in pitch. The wrist movement switch 50 comprises a base 52 mounted to one of the forearm member 20 and the metacarpal member 22 and a plate 54 mechanically connected to the other of the forearm member 20 and the metacarpal member 22. The base 52 has four base electrical contacts 56 equidistant from a base center 58 that are arrayed in orthogonal disposition about the center 60 as shown in the figures. The plate 54 mounted on a distal end 62 of a flexible rod 64 is spaced apart from the base 52 and has four corresponding plate electrical contacts 66 opposing the four base electrical contacts 56. A proximal end 68 of the rod 64 is mounted to the other of the forearm member 20 and the metacarpal member 22 such that when the user's wrist 104 moves left, right, up or down, one of the plate electrical contacts 66 moves into contact with one of the base electrical contacts 56, thus indicating movement of the wrist 104 by which electrical contacts are moved into contact, if any. Movement of the user's wrist 104 into position where two adjacent contacts both make electrical connection indicates a wrist orientation in yaw and in pitch. For example, the wrist may move left in yaw and down in pitch, providing electrical connection at both corresponding contacts. Thus, there are nine recognizable metacarpus positions, or wrist orientations, for each hand.

When a finger 108 moves downward as described above to actuate the finger switch 30, any electrical contact between the base 52 and the plate 54 communicates an electrical signal to the computer processor 170 indicating a position of the wrist 104.

In use then, the user identifies a symbol or command by adjusting his wrist, and thus his metacarpus, to a discrete position of the metacarpus in yaw and in pitch. Simultaneously, the user adjusts a selected finger to a discrete position in pitch such that the wrist positioned in yaw and pitch and the selected finger positioned in pitch uniquely identifies a selective alphanumeric or other symbol, or command. The user then exercises the selected finger in a downward motion by rotating the user's finger downward in the finger's metacarpal joint, therein pulling the tether between the finger distal member and the finger switch to activate the switch and then releasing the finger switch by reversing the downward motion. The process is repeating to enter additional selective alphanumeric or other symbols or commands in the normal manner of keyboard data entry.

It should be understood that the device switches are intended to function in the manner of a traditional keyboard to exploit the familiarity of keyboard acquired by intended users. Thus, the switches are dichotomous, either in a contact or a noncontact position. Also as in keyboard use, the user can feel when an intended contact is made by feeling when contact is made in the switches thus indicating to the user that an intended symbol or command has been identified and communicated to the computer processor.

Having described the invention, what is claimed is the following:

1. A keystroke communication device simulating a keyboard and adapted to be attached to a user's fingers having finger metacarpal, proximal and distal joints and proximal, intermediate and distal segments, a thumb having thumb metacarpal, proximal and distal joints and metacarpal, proximal and distal segments, and a metacarpus of the user's hand and to the user's forearm to track the user's wrist and finger movement as keystrokes but without a keyboard, comprising,
   a forearm member attached to the user's forearm,
   a metacarpal member positioned at the metacarpus of the user's hand and adapted to move in concert with movement of the metacarpus relative to the forearm member as the user's wrist moves in yaw between discrete left, right, and central yaw positions,
   a plurality of finger and thumb members adapted to be positioned respectively at the user's fingers and thumb of a user's hand and adapted to move in concert with movement of the user's respective fingers and thumb,
   a dichotomous finger switch associated with each of the finger and thumb members with active and inactive positions connected to each of the finger members and activated by downward movement of a downward-moving finger member being one of the plurality of finger and thumb members, the finger switch also connected to a computer processor such that upon downward movement of the downward-moving finger member, identification the downward-moving finger member and the position of the wrist in yaw is received by a computer processor with which the device communicates as a unique data entry.

2. The device of claim 1 wherein the metacarpal member is positioned to move in concert with movement of the metacarpus relative to the forearm member as the user's wrist also moves in pitch between discrete wrist pitch positions of up, central, and down positions, the wrist pitch positions being independent of the wrist yaw positions.

3. The device of claim 2 in which wrist pitch positions function in combination with the yaw positions therein defining nine discrete metacarpus positions.

4. The device of claim 3 in which said wrist pitch and yaw positions function in combination with said plurality of finger and thumb members to represent unique data representations.

5. The device of claim 1 wherein said finger members adapted to be positioned respectively at the user's fingers comprise for each finger member
   a finger proximal member positioned beyond the user's metacarpal joint and adapted to move in concert with movement of the user's proximal finger segment relative to the user's metacarpus as the user's proximal finger segment moves in pitch,
   a finger distal member positioned beyond the user's proximal joint opposite the finger proximal member and adapted to move in concert with movement of the user's intermediate and distal finger segments relative to the proximal finger segment as the user's finger moves in pitch, the distal member moving between at least two discrete pitch positions, the at least two pitch positions in combination with the yaw positions of the metacarpal member therein comprise at least six discrete positions representing six unique data representations, which in combination with five fingers, including a thumb, represents a plurality of unique data representations for each user hand,
   a finger-thumb pitch switch at the proximal joint of each finger and thumb communicating orientation of the finger members to the computer processor.

6. The device of claim 4 wherein said thumb member adapted to be positioned respectively at the user's thumb comprises
   a thumb proximal member positioned beyond the user's thumb metacarpal joint and adapted to move in concert with movement of the user's thumb proximal segment relative to the metacarpus as the user's thumb proximal segment moves,
   a thumb distal member positioned beyond the user's thumb distal joint and adapted to move in concert with movement of the user's thumb distal segment relative to the thumb proximal segment as the user's thumb moves, the thumb proximal member and the thumb distal member moving together between at least two discrete thumb positions, the at least two discrete thumb positions functioning in combination with the yaw positions of the metacarpal member therein comprise at least six discrete positions representing six unique data representations.

7. The device of claim 5 wherein the at least two pitch positions comprises three pitch positions for four fingers of the hand and three positions for the thumb, which act in combination with the yaw positions of the metacarpal member therein to represent a plurality of unique data representations.

8. The device of claim 2 wherein said finger members adapted to be positioned respectively at the user's fingers comprise for each finger member
   a finger proximal member positioned beyond the user's metacarpal joint and adapted to move in concert with movement of the user's proximal finger segment relative to the user's metacarpus as the user's proximal finger segment moves in pitch,
   a finger distal member positioned beyond the user's proximal joint opposite the finger proximal member and adapted to move in concert with movement of the user's intermediate and distal finger segments relative to the proximal finger segment as the user's finger moves in pitch, the distal member moving between at least two discrete pitch positions, the at least two pitch positions in combination with the yaw positions of the metacarpal member therein comprise at least six discrete positions representing six unique data representations, which in combination with five fingers, including a thumb, represents a plurality of unique data representations for each user hand, and a finger-thumb pitch switch at the proximal joint of each finger and thumb communicating orientation of the finger members to the computer processor.

9. The device of claim 5 wherein the wrist pitch positions and the finger pitch positions move in combination between at least three combined pitch positions.

10. The device of claim 1 wherein downward movement of a user's finger required to activate the respective finger switch is determined by movement of the proximal member relative to the metacarpal member.

11. The device of claim 1 further comprising a wrist movement switch comprising a base mounted to one and a plate mechanically connected to the other of the forearm member and the metacarpal member, the base having four base electrical contacts equidistant from a base center arrayed in orthogonal disposition, the plate spaced apart from the base and having four plate electrical contacts opposing the four base electrical contacts, the plate mounted on a distal end of a rod, a proximal end of the rod mounted to the other of the forearm member and the metacarpal member such that when the user's wrist moves left, right, up or down, one of said plate electrical contacts moves into contact with one of said base electrical contacts adapted to indicate such movement by which electrical contacts are in contact, if any, and wherein electrical contact between the base and the plate communicates an electrical signal to said computer processor indicating said movement upon said downward movement of a finger actuating said finger switch.

12. The device of claim 11 wherein the wrist movement switch is adapted to record wrist movement combining a wrist movement in pitch with a wrist movement in yaw as a further position identifier.

13. The device of claim 12 wherein the wrist movement switch includes at least three yaw positions of left, center and right and three pitch positions of up, center and down, and combined pitch and yaw positions of down-left, down-center, down-right, left, center, right, up-left, up-center, and up-right, each in combination with a selected finger position identifies a symbol or command.

14. The device of claim 1 wherein said finger switch comprises a tether secured at a first end to a proximal, intermediate or distal member and at a second end to a finger switch actuator opposite the user's metacarpal joint from the tether first end, said actuator adapted to move finger switch contacts into electrical connection therein sending a signal to the computer processor when the tether is pulled by downward motion of the user's finger or downward or inward movement of the user's thumb and releasing said connection upon upward movement of the user's finger or upward or outward movement of the user's thumb.

15. The device of claim 14 wherein the actuator is pivotably secured on a pivot pin in a finger switch base aft of the metacarpal joint, the actuator urging a first electrical contact down against spring bias into contact with a second electrical contact, the first and second electrical contacts in electrical communication with said computer processor.

16. The device of claim 14 wherein the actuator is secured at the user's metacarpus adapted to measure the movement of the user's finger.

17. The device of claim 14 wherein the actuator is secured at the user's forearm adapted to measure the combined downward movement of the user's finger and wrist.

18. The device of claim 8 wherein said finger-thumb pitch switch comprises a finger-thumb pitch actuator in a central, or relaxed position, where no electrical contact is made, an up contact and a down contact extending from the proximal segment between the up contact and the down contact with which the pitch actuator makes electrical connection when the finger or thumb is in extension and flexion, respectively, which connection is communicated to the computer processor for interpretation indicating relative position of the finger member.

19. A keystroke communication device simulating a keyboard and adapted to be attached to a user's fingers having finger metacarpal, proximal and distal joints and proximal, intermediate and distal segments, a thumb having thumb metacarpal and distal joints and proximal and distal segments, and a metacarpus of the user's hand and to the user's forearm to track the user's wrist and finger movement as keystrokes but without a keyboard, comprising, a forearm member attached to the user's forearm, a metacarpal member positioned at the metacarpus of the user's hand and adapted to move in concert with movement of the metacarpus relative to the forearm member as the user's wrist moves in yaw between discrete left, right, and central yaw positions, a plurality of finger members positioned respectively at the user's fingers and adapted to move in concert with movement of the respective fingers, the finger members further comprising a finger proximal member positioned beyond the user's metacarpal joint and adapted to move in concert with movement of the user's proximal finger segment relative to the metacarpus as the user's proximal finger segment moves in pitch, a finger distal member positioned beyond the user's proximal joint opposite the finger proximal member and adapted to move in concert with movement of the user's intermediate and distal finger segments relative to the proximal finger segment as the user's finger moves in pitch, the distal member moving between at least two discrete pitch positions, the at least two pitch positions in combination with the yaw positions of the metacarpal therein comprise at least six discrete positions representing six unique data representations, which in combination with five fingers, including a thumb, represents at least thirty unique data representations for each user hand, a thumb proximal member positioned beyond the user's thumb metacarpal joint and adapted to move in concert with movement of the user's thumb proximal segment relative to the metacarpus as the user's thumb proximal segment moves, a thumb distal member positioned beyond the user's thumb distal joint and adapted to move in concert with movement of the user's thumb distal segment relative to the thumb proximal segment as the user's thumb moves, the thumb proximal member and the thumb distal member moving together between at least two discrete positions, the at least two discrete thumb positions functioning in combination with the yaw positions of the metacarpal member therein comprise at least six discrete positions representing six unique data representations, a dichotomous finger switch with active and inactive positions switch connected to each of the finger members and activated by downward movement of the respective finger, the finger switch also connected to a computer processor such that upon downward movement of the respective finger, the position of the respective finger and the wrist is recorded as a unique data entry, wherein the metacarpal member is positioned to move in concert with movement of the metacarpus relative to the forearm member as the user's wrist moves in pitch between discrete wrist pitch positions of up, central, and down positions, the wrist pitch positions being independent of the yaw positions in which wrist pitch positions function in combination with the yaw positions therein defining nine discrete metacarpus positions, in which the wrist pitch positions and the finger and thumb pitch positions move in combination between at least three combined pitch positions, wherein downward movement of a finger required to activate the respective finger switch is determined by relative movement of the finger proximal member in the finger metacarpal joint and movement of a thumb required to activate the respective finger switch is determined by relative movement of the thumb proximal member in the thumb metacarpal joint, a wrist movement switch comprising a base mounted to one and a plate mechanically connected to the other of the forearm member and the metacarpal member, the base having four base electrical contacts equidistant from a base center arrayed in orthogonal disposition, the plate spaced apart from the base and having four plate electrical contacts opposing the four base electrical contacts, the plate mounted on a distal end of a rod, a proximal end of the rod mounted to the other of the forearm member and the metacarpal member such that when the user's wrist moves left, right, up or down, one of said plate electrical contacts moves into contact with one of said base electrical contacts adapted to indicate such movement by which electrical contacts are in contact, if any, and wherein electrical contact between the base and the plate communicates an electrical signal to said computer processor indicating said movement upon said downward movement of a finger actuating said finger switch, a finger-thumb pitch switch at the proximal joint of each finger and thumb communicating orientation of the finger members to the computer processor.

20. The device of claim 19 further comprising a glove adapted to be worn by the user, the glove having a forearm section, a metacarpal section and finger and thumb sections adapted to fit over the fingers, metacarpus, and forearm of a user, the forearm member attaching to the glove forearm section, the metacarpal member attaching to the glove metacarpal section, and the finger and thumb members attaching to the glove finger and thumb sections, finger switch mounted to the glove in the glove forearm or metacarpal section, and the wrist movement switch base mounted to the forearm member in the forearm section one and the plate mechanically connected to the metacarpal member in the metacarpal section.

21. The method of a user inputting keyboard keystroke data to a data processor without using a keyboard, comprising the following steps:

a. Fitting a glove on a hand of the user, the glove having a forearm section, a metacarpal section and finger and thumb sections adapted to fit over the fingers, metacarpus, wrist and forearm of a user, the glove being outfitted with members adapted to track movement of the user's hand, fingers and thumb including a forearm member, a metacarpal member, a plurality of finger members, the forearm member attaching to the glove forearm section, the metacarpal member attaching to the glove metacarpal section, and the finger and thumb members attaching to the glove finger and thumb sections, with a dichotomous finger switch with active and inactive positions mounted to the glove in the glove forearm or metacarpal section, and a wrist movement switch connected between the forearm member in the forearm section and the metacarpal member in the metacarpal section adapted to sense movement of the wrist between discrete positions in yaw and in pitch, b. The user adjusting the wrist to a discrete position of the metacarpus in yaw, c. The user adjusting the wrist to a discrete position of the metacarpus in pitch, d. The user adjusting a selected fingers to a discrete position in pitch, the wrist position in yaw and pitch and the selected finger in its position in pitch uniquely identifying a selective alphanumeric or other symbol, or command, e. The user exercising the selected finger in a downward motion by rotating the user's finger downward in the finger's metacarpal joint, therein pulling a tether between the finger distal member and the finger switch to activate the switch, identifying the respective wrist and finger positions in an electronic message to the computer processor, interpreted in the computer processor as said selective alphanumeric or other symbol or command, f. Disconnecting said finger switch by lifting said selected finger in an upward motion.

g. Repeating steps b–f to enter additional selective alphanumeric or other symbols or commands.

* * * * *